United States Patent
Kim

(10) Patent No.: US 7,199,810 B2
(45) Date of Patent: Apr. 3, 2007

(54) BEAM SCANNING APPARATUS HAVING POLARIZATION DIRECTION ADJUSTER

(75) Inventor: Dae-hwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 10/652,497

(22) Filed: Sep. 2, 2003

(65) Prior Publication Data

US 2004/0042058 A1   Mar. 4, 2004

(30) Foreign Application Priority Data

Sep. 4, 2002   (KR)   ............................... 2002-53170

(51) Int. Cl.
  *B41J 2/385*   (2006.01)
  *B41J 2/47*    (2006.01)
(52) U.S. Cl. .................... 347/136; 347/239; 347/255
(58) Field of Classification Search ................ 347/239, 347/241, 255–256, 134–136; 355/35; 349/1–5, 349/10, 95, 86, 183, 193–202, 120; 356/15; 362/561; 252/299.2, 582–589; 399/4; 250/331; 345/50–54; 353/20; 358/296
See application file for complete search history.

(56) References Cited

U.S. PATENT DOCUMENTS

| | | | | |
|---|---|---|---|---|
| 4,790,632 A | * | 12/1988 | Miyakawa et al. | ............ 349/95 |
| 5,515,097 A | * | 5/1996 | Munechika et al. | ......... 347/241 |
| 5,877,844 A | * | 3/1999 | Matsumoto | ................... 355/35 |
| 6,072,566 A | * | 6/2000 | Fujii et al. | ..................... 356/15 |
| 6,081,346 A | * | 6/2000 | Terajima et al. | ............. 358/296 |
| 6,587,171 B1 | * | 7/2003 | Georges et al. | .............. 349/120 |
| 6,592,224 B2 | * | 7/2003 | Ito et al. | ......................... 353/20 |
| 2003/0007068 A1 | * | 1/2003 | Miyagawa | ................... 347/241 |

* cited by examiner

*Primary Examiner*—Hai Pham
(74) *Attorney, Agent, or Firm*—Staas & Halsey LLP

(57) ABSTRACT

A beam scanning apparatus projects a beam onto a photoconductive drum according to corresponding image data, and includes a micro polarized array which is formed to receive a beam emitted from a light source and has a plurality of polarized cells arrayed in a predetermined direction. A polarization direction adjuster adjusts transmission directions of polarized elements of each polarized cell according to the image data. A light detecting plate receives the beam from the micro polarized array, transmitting polarized elements having a predetermined direction to a photoconductive drum.

18 Claims, 4 Drawing Sheets

BEAM SCANNING APPARATUS HAVING POLARIZATION DIRECTION ADJUSTER

CROSS-REFERENCE TO RELATED APPLICATIONS

This application claims the priority of Korean Patent Application No. 2002-53170, filed Sep. 4, 2002, in the Korean Intellectual Property Office, the disclosure of which is incorporated herein by reference.

BACKGROUND OF THE INVENTION

1. Field of the Invention

The present invention generally relates to a beam scanning apparatus, and more specifically, to a beam scanning apparatus which projects a ray of light using a polarized cell.

2. Description of the Related Art

Generally, an image forming device such as a laser printer reproduces an image in a manner in which a ray emitted from a laser diode is focused on a photoconductive drum, forming a latent image thereon according to an image signal as received, and the latent image formed on the photoconductive drum is developed and then transferred onto a sheet of paper to be printed.

FIG. 1 is a schematic diagram showing a conventional laser scanning apparatus used in a laser printer.

Referring to FIG. 1, the laser scanning apparatus 100 includes a laser diode 105, a collimator lens 110, a cylinder lens 120, a polygon mirror 130, a driving device 140, an F-θ lens 150, a reflection mirror 160, a photoconductive drum 170, a horizontal synchronization mirror 180, and a light sensor 190.

The laser diode 105 emits a beam. The collimator lens 110 renders the beam emitted from the laser diode 105 into a parallel beam with respect to an optical axis.

The cylinder lens 120 makes the parallel beam from the collimator lens 110 into a linear beam parallel to a sub scanning direction. The polygon mirror 130 scans with the linear beam from the cylinder lens 120 while moving at a constant linear velocity, thus moving the beam at a constant linear velocity. The driving device 140 is a motor rotating the polygon mirror 130 at the constant speed.

The F-theta lens 150 has a fixed refractive index with respect to the optical axis and refracts the beam which is reflected from the polygon mirror 130 at a fixed angle towards the main scanning direction. The F-theta lens 150 adjusts the focus on a scanning surface after correcting the aberration of the beam reflected from the polygon mirror 130. The reflection mirror 160 reflects the beam from the Fθ lens 150 in a certain direction so as to scan the beam on the surface of the photoconductive drum 170.

The horizontal synchronization mirror 180 reflects the beam from the F-theta lens 150 to the light sensor 190.

The light sensor 190 receives the beam reflected from the horizontal synchronization mirror 180. An output signal from the light sensor 190 is used for scanning synchronization.

According to the conventional laser scanning apparatus 100, a scan line reflected from the polygon mirror 130 is incident on the photoconductive drum 170 in the main scanning direction, thereby forming the scan line. Multiple scan lines are also formed along the sub scanning direction, crossing at right angles with the main scanning direction while the photoconductive drum 170 is being rotated.

The light sensor 190 receives the beam reflected from the horizontal synchronization mirror 180 and thus adjusts horizontal synchronization. As a result, starting points of the scan lines are aligned, and thus, images of scan lines having less deviation in starting points can be produced.

In the conventional scanning apparatus 100, however, the F-theta lens 150 must be precisely disposed in order to produce images of scan lines having less deviation in starting points. Moreover, the laser scanning apparatus 100 is found to be less effective in that noise rises in accordance with the increased rotation speed of the driving device 140 for high speed printing. Furthermore, because the respective scan lines are formed by pixels, there is a limit in printing speed.

SUMMARY OF THE INVENTION

Accordingly, it is an aspect of the present invention to provide a beam scanning apparatus capable of reducing noise during printing, and accelerating the speed of printing.

Additional aspects and advantages of the invention will be set forth in part in the description which follows and, in part, will be obvious from the description, or may be learned by practice of the invention.

The foregoing and/or other aspects of the present invention may be achieved by providing a beam scanning apparatus which projects a beam onto a photoconductive drum according to image data, including a light source to emit the beam; a micro polarized array to receive the beam emitted from the light source, comprising a plurality of polarized cells arrayed along a predetermined direction; a polarization direction adjuster adjusting transmission directions of each of the polarized cells according to the image data; and a light detecting plate to receive the beam from the micro polarized array, to transmit polarized elements of the received beam of a predetermined direction therethrough and to emit the transmitted elements to the photoconductive drum.

The apparatus further includes a micro-lens array having a plurality of lenses formed between the light detecting plate and the photoconductive drum, to focus the beams from the light detecting plate by pixel areas corresponding to the polarized cells and emitted to the photoconductive drum.

The polarized cells may be made of high polymer materials which vary in polarization direction in accordance with applied tension or not, and a polarization direction adjuster includes a plurality of driving devices connected to each of the polarized cells so as to contract the polarized cells according to electrical signals. The driving devices may be a piezoelectric sensor.

Further provided is a reflective member that reflects beams emitted from the light source in a direction different from the micro polarized array, so that the beams can fall incident on the micro polarized array.

The light source, the micro polarized array, the light detecting plate, the micro-lens array, and the photoconductive drum are disposed on a same plane and in parallel with each other.

The present beam scanning apparatus may be used in various image forming apparatuses, such as a scanner, a facsimile, a printer, or a multifunction machine, and printing at a high speed is possible.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
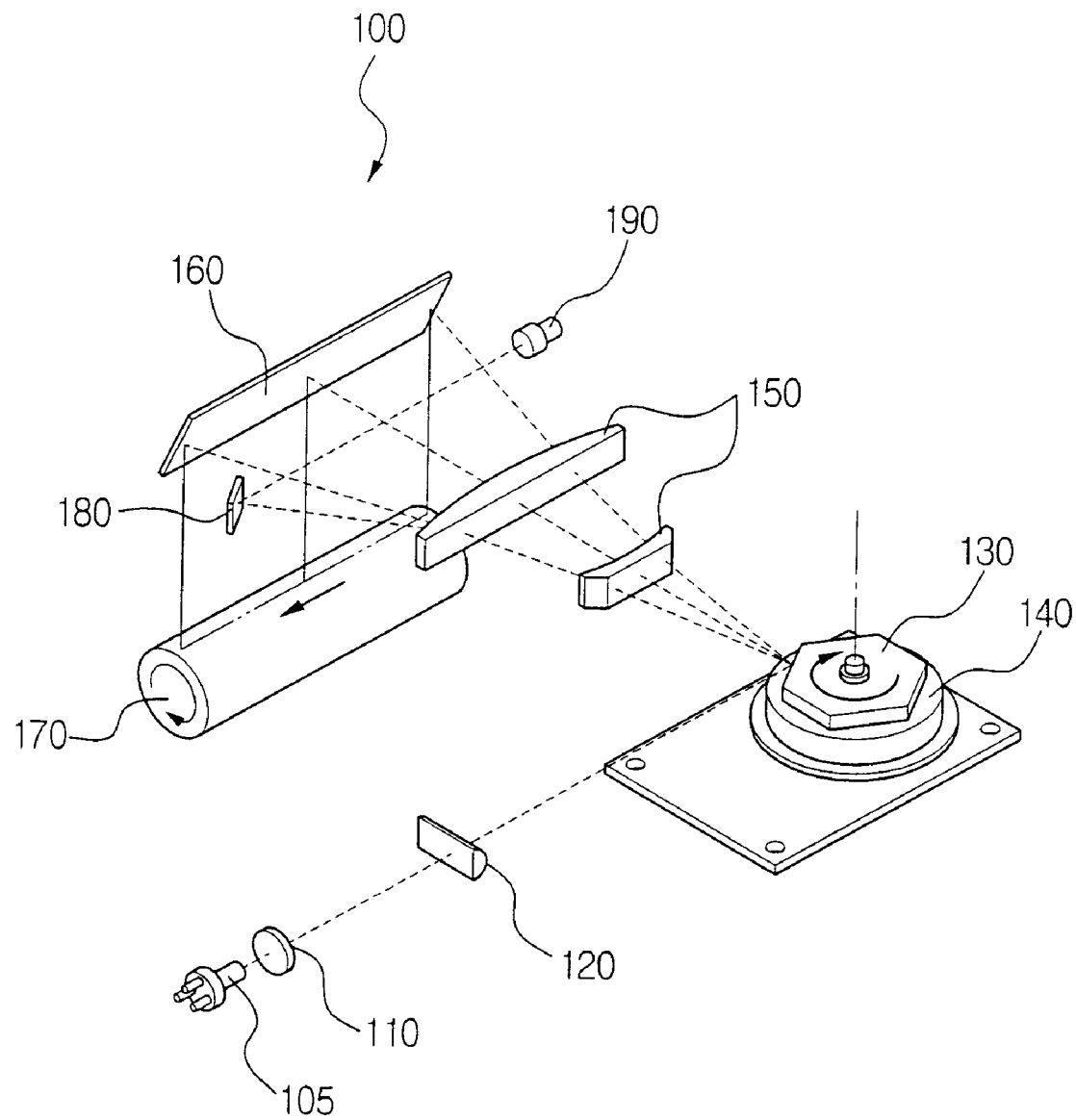
FIG. 1 is a schematic diagram showing a conventional laser scanning apparatus used in a laser printer.

Reference will now be made in detail to the present preferred embodiments of the present invention, examples of which are illustrated in the accompanying drawings, wherein like reference numerals refer to like elements throughout.

Figure 2:
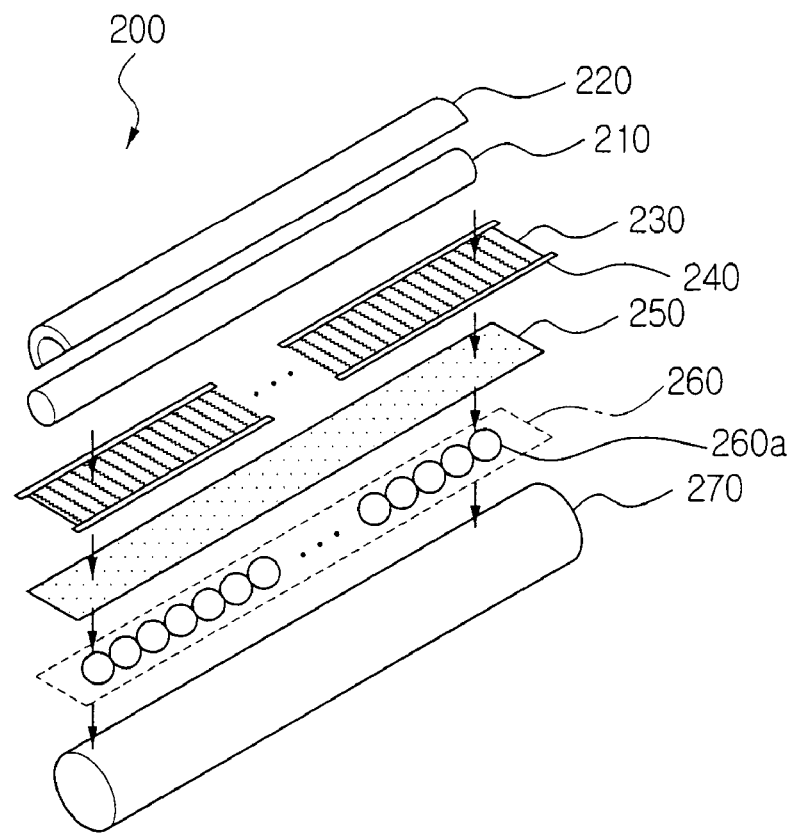
FIG. 2 is a view showing a beam scanning apparatus according to an embodiment of present invention.

FIG. 2. is a view showing a beam scanning apparatus 200 according to an embodiment of the present invention.

Referring to FIG. 2, the beam scanning apparatus 200 includes a light source 210, a reflective member 220, a micro polarized array 230, a polarization direction adjuster 240, a light detecting plate 250, and a micro-lens array 260. For convenience of explanation, a photoconductive drum 270 is also illustrated.

The light source 210, the reflective member 220, the micro polarized array 230, the polarization direction adjuster 240, the light detecting plate 250 and the micro-lens array 260 may be arranged on a same plane and in parallel with respect to a lengthwise direction of the light source 210. In FIG. 2, the optical paths are indicated schematically by the arrows. However, it is also possible to change the optical paths using a mirror (not shown) or the like.

The light source 210 is cylindrical and uses a lamp which emits beams in the direction along the length of the cylindrical light source 210. Additionally, the light source 210 is capable of emitting linear beams by arraying a plurality of laser diodes in a row corresponding to the pixels.

The reflective member 220 reflects the beams emitted from the light source 210, which beams are emitted in a different direction than that of the later-mentioned micro polarized array 230, in the direction of the micro polarized array 230. Thus, the reflective member 220 is formed nearby the light source 210 and uses a concave mirror.

The micro polarized array 230 is formed so that beams from the light source 210 can be incident thereon, and is provided with a plurality of polarized cells 230a arrayed along the predetermined direction. The polarized cells 230a are made of high polymer materials of which polarization direction is determined according to whether or not there is tension applied from the polarization direction adjuster 240.

The polarization direction adjuster 240 adjusts a transmission direction of each of the polarized elements 230 according to image signals. To this end, the polarized adjuster 240 can activate each of the polarized cells 230a independently.

There are provided a plurality of driving devices 240a that generate tension for contracting the polarized cells 230a according to electrical signals. In one embodiment, the driving devices 240a are piezoelectric elements.

Reference numeral 240b denotes an electrical insulation layer between the driving devices 240a.

The light detecting plate 250 is formed to receive beams from the micro polarized array 230 and transmits a polarized light in a predetermined direction.

When the polarization direction of the beam which has passed through the micro polarized array 230 corresponds to the predetermined direction of the light detecting plate 250, the light detecting plate 250 passes the beam towards the micro-lens array 260.

Meanwhile, the light detecting plate 250 shuts off the beam from the micro polarized array 230, if the polarization direction of the micro polarized array 230 and the direction of the light detecting plate 250 are different from each other.

The micro-lens array 260 is so formed that a plurality of lenses 260a are arrayed therein. Accordingly, the beams that pass through the light detecting plate 250 are focused at a plurality of lenses 260a by pixel units corresponding to the polarized cells 230a, emitted from the micro-lens array 260, and formed as a latent image on the surface of the photoconductive drum 270.

Figure 3:
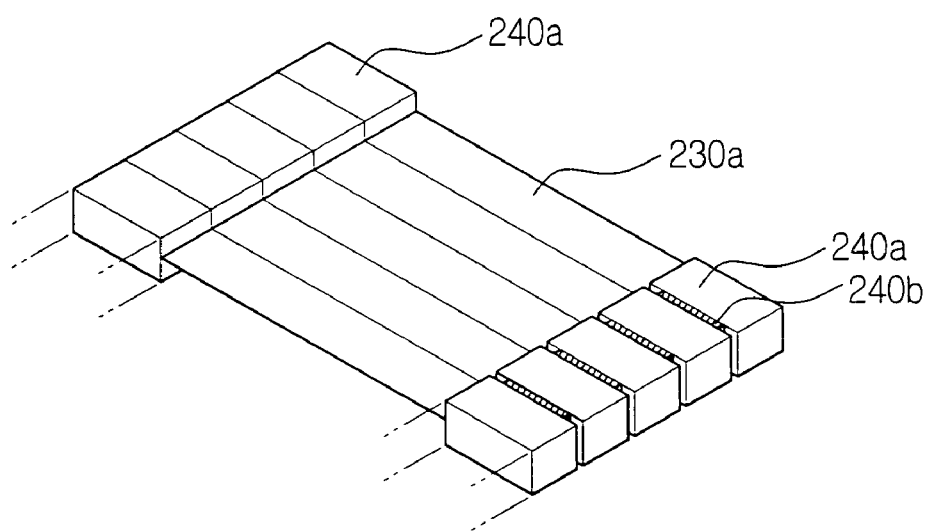
FIG. 3 is an enlarged perspective view showing a part of a micro polarized array in FIG. 2.

FIG. 3 is an enlarged diagram showing a portion of the micro polarized array and the polarization direction adjuster 240 shown in FIG. 2.

Referring to FIGS. 2 and 3, the micro polarized array 230 and the polarization direction adjuster 240 are arranged in parallel with the length direction of the cylindrical light source 210. More specifically, a plurality of the micro polarized cells 230a and the driving devices 240a are arranged in a row, as shown in FIG. 3, and also in parallel with the length direction of the light source 210.

A plurality of the micro polarized cells 230a are provided adaptively according to the predetermined resolution. For example, when a printer with the beam scanning apparatus 200 prints 600 dots per inch (25.4 mm) in A4 size paper, 4,960 micro polarized cells 230a are formed on one line, i.e., a single scanning beam by, $$\left(\frac{210 \text{ mm}}{-25.4 \text{ mm}}\right) \times 600 \text{ dots} \approx 4,960$$

In other words, the aforementioned number (4,960) is the number of micro polarized cells 230a arranged across the width of A4 size paper (210 mm×297 mm) when the A4 size paper is printed lengthwise.

The micro polarized cells 230a are made of a high polymer film like Poly Vinyl Alcohol (PVA) which is doped with iodine. Because of the iodine, the micro polarized cells 230a convert the beam into the polarized beam which is perpendicular to the direction of the high polymer array. The polarization direction of each of the micro polarized cells 230a is determined according to whether or not there is tension applied from the respective corresponding driving devices 240a.

The driving devices 240a are formed at both ends of the micro polarized cells 230a. The driving devices 240a drive the micro polarized cells 230a corresponding to image data of each pixel received from an image signal controller (not shown). The driving devices 240a generate tension using piezoelectric elements or the like and drive the micro polarized cells 230a by using the generated tension.

Figure 4A:
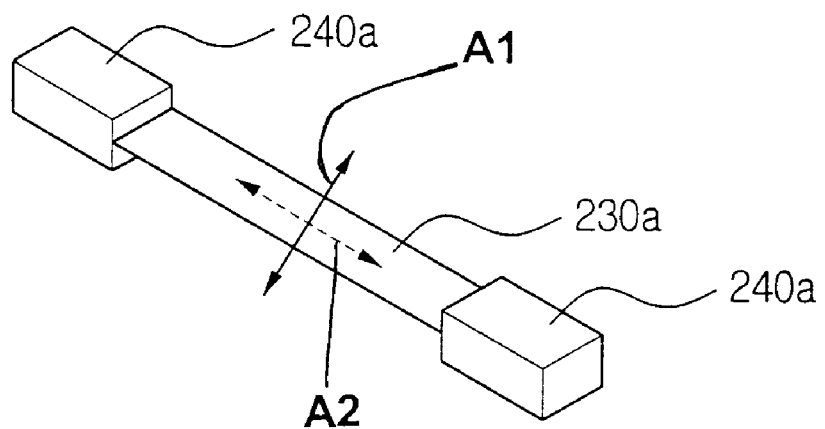
FIG. 4A is a view showing the operation of the micro polarized element if an off-signal is sent to a driving device.
Figure 4B:
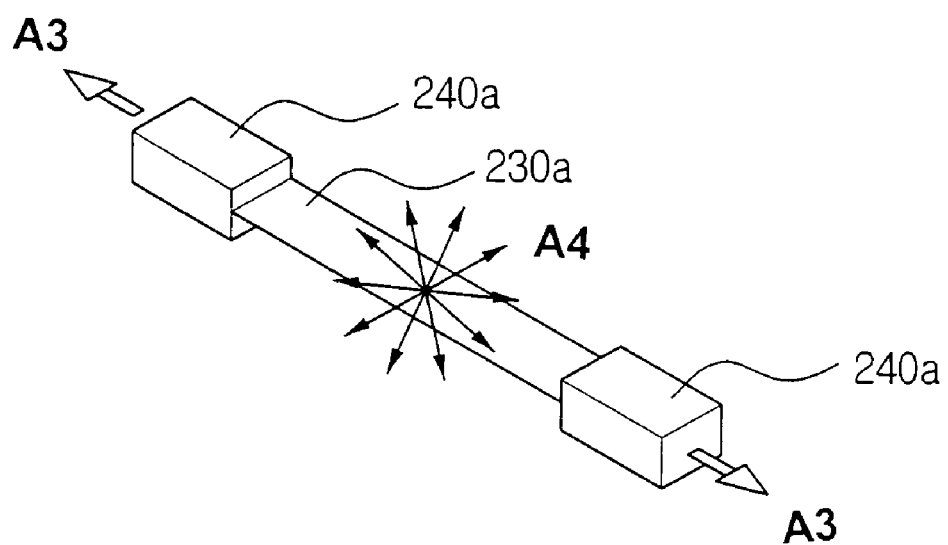
FIG. 4B is a view showing the operation of the micro polarized element if an on-signal is sent to a driving device.

Referring to FIGS. 4A and 4B, operation principles of the micro polarized array 230 of FIG. 2 will be explained as below.

When image data for printing is received for the pixel from the image signal controller (not shown), the respective driving devices 240a generate tension according to the received image data. Accordingly, when the image data for the pixel has an on-signal, the corresponding driving device 240a generates tension, whereas the same driving device 240a does not generate tension when the image data has an off-signal.

FIGS. 4A and 4B are views respectively showing the operation of the micro polarized cells 230a, with the off-signal, and with the on-signal.

When the driving devices 240a receive off-signal image data, high polymer doped on the micro polarized cells 230a that are in association with the driving devices 240a is arrayed in the predetermined polarization direction. At this time, beams from the micro polarized cells 230a have a predetermined polarization direction.

In the present invention, the case of high polymer arrayed in the horizontal scanning direction is shown as a solid arrow A1 in FIG. 4A. Here, beams from the micro polarized cell 230a are polarized in the sub scanning direction (direction of the dotted arrow A2).

Meanwhile, when the driving devices 240a receive on-signal image data, the driving devices 240a, as shown in FIG. 4B, generate tension for the micro polarized cells 230a that are formed in association with the driving devices 240a in the sub scanning direction (direction of the bold arrow A3).

Due to the generated tension, the high polymer arrangement of the micro polarized cells 230a is randomized as arrows A4 in FIG. 4B and accordingly, beams passing therethrough are also polarized in the randomized direction.

The process of forming a latent image on the photoconductive drum 270 is now explained.

Figure 5A:
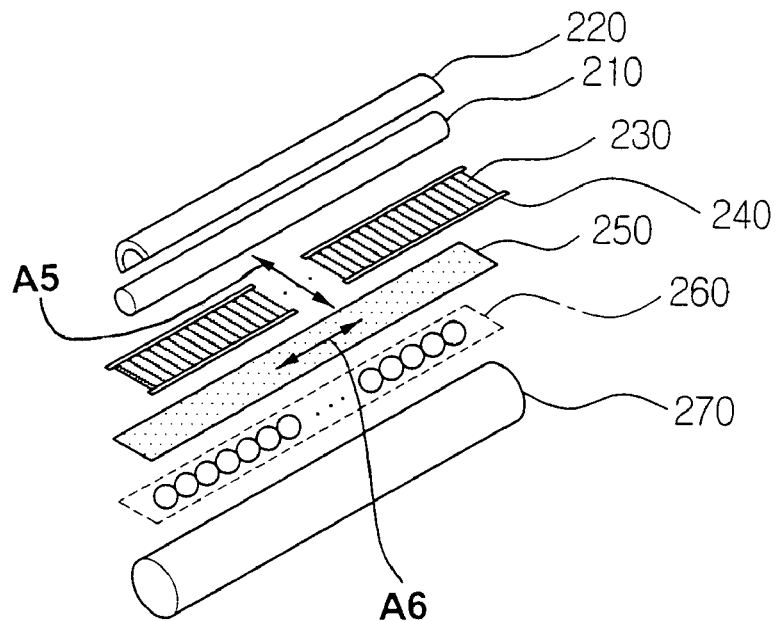
FIGS. 5A and 5B are views showing an operation of the beam scanning apparatus of FIG. 2 to which operations of FIGS. 4A and 4B are applied.
Figure 5B:
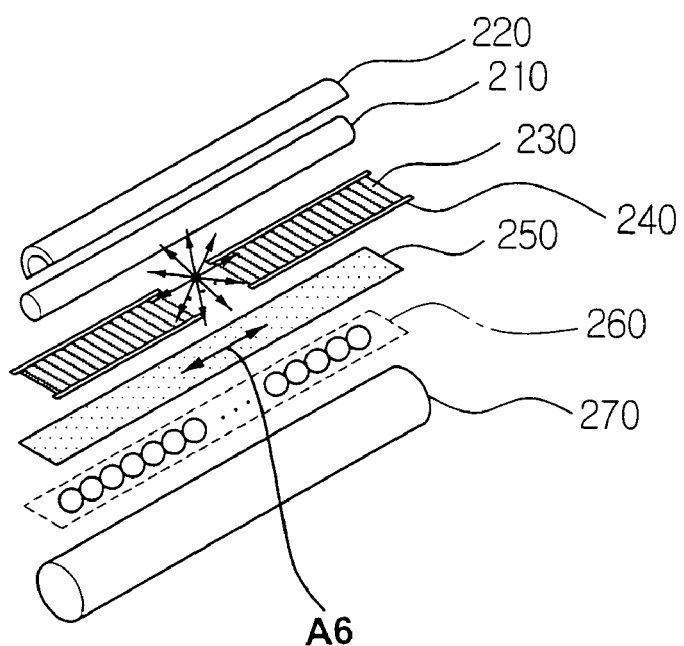

FIGS. 5A and 5B are views showing the operations of FIG. 2 and FIGS. 4A and 4B.

The light source 210 constantly emits linear beams once a printer (not shown) is provided with power or is input with a print command.

When the image data for each pixel is input into the driving devices 240a in the unit of the scan line, the driving devices 240a adjust the polarization direction of each of the micro polarized cells 230a according to the image data.

Referring to FIG. 5A, as off-signal image data is input into the driving devices 240a, high polymer films of the micro polarized cells 230a are arranged in the predetermined main scanning direction, and beams passing therethrough are polarized in the sub scanning direction which is perpendicular to the main scanning direction (see arrow A5 marked on the micro polarized array 230).

The light detecting plate 250 has a predetermined first polarization direction. Hereinafter, the first polarization direction refers to, for convenience of explanation, the horizontal scanning direction (arrow A6 marked on the light detecting plate 250).

When the light detecting plate 250 has the predetermined first polarization direction, the polarization direction of the micro polarized cell 230a is perpendicular to that of the light detecting plate 250, and beams which have passed through the micro polarized cells 230a pass in the sub scanning direction of the micro polarized cells 230a. Therefore, beams from the micro polarized cells 230a are not transmittable through the light detecting plate 250 that has the polarization direction in the main scanning direction. As a result, no latent image is formed on the surface of the photoconductive drum 270.

Meanwhile, as shown in FIG. 5B, as on-signal image data is input into the driving devices 240a, the driving devices 240a at both ends of the micro polarized cells 230a generate tension in the direction perpendicular to the main scanning direction.

Consequently, high polymer films of the micro polarized cells 230a are arranged in a randomized direction instead of the main directions, and the beams from the micro polarized cell 230a are also polarized in the randomized direction.

Accordingly, beams having the same polarization direction as the light detecting plate 250 are transmittable into the micro-lens array 260 among randomly polarized beams from the micro polarized cells 230a.

Beams transmitted through the light detecting plate 250 are passed through the micro-lens array 260 and focused on the surface of the photoconductive drum 270 in the form of a latent image. When the latent image is formed on the photoconductive drum 270 with a single scanning line being formed simultaneously or by units of a predetermined block, the photoconductive drum 270 rotates at a certain interval and speed.

When the photoconductive drum 270 rotates at the certain interval, each of the driving devices 240a drives the corresponding micro polarized cell 230a according to new image data and a new latent image is formed on the surface of the photoconductive drum 270.

The above process for forming latent images continues and it is possible to control driving periods for the driving device 240a and a rotating period for the photoconductive drum 270 by means of predetermined processes.

When the beam scanning apparatus 200 is applied to a printer (not shown), printing speed is accelerated. For instance, simultaneously driving the driving devices 240a in a row at 100 kHz will result in 80 sheets of paper per minute.

According to the embodiment of the present invention, the beam scanning apparatus selectively polarizes an incident beam using a plurality of polarized cells, and then forms a latent image, thereby speeding up printing of a single scanning beam. Moreover, the beam scanning apparatus of the present invention reduces noise and creates a high-quality picture due to the regular starting point at which the beam is scanned.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A beam scanning apparatus which projects a beam onto a photoconductive drum according to image data comprising:

a light source to emit the beam;

a micro polarized array to receive the beam emitted from the light source, comprising a plurality of polarized cells arrayed along a predetermined direction, respective transmission directions of the respective polarized cells varying according to whether the respective cells are contracted;

a polarization direction adjuster to adjust the transmission directions of each of the polarized cells according to the image data; and a light detecting plate to receive the beam from the micro polarized array, to transmit polarized elements of the received beam in a predetermined direction therethrough and to emit the transmitted elements to the photoconductive drum.

2. The beam scanning apparatus in claim 1, further comprising a micro-lens array having a plurality of lenses formed between the light detecting plate and the photoconductive drum, to focus the polarized beams from the light detecting plate by pixel areas corresponding to the polarized cells and to emit the focused beams to the photoconductive drum.

3. The beam scanning apparatus in claim 2, wherein the light source the micro polarized array, the light detecting plate, the micro-lens array, and the photoconductive drum are disposed on a same plane and in parallel with each other.

4. The beam scanning apparatus in claim 1, further comprising a reflective member that reflects the beams emitted from the light source in a direction different from the direction of the micro polarized array, so that the beams can fall incident on the micro polarized array.

5. A beam scanning apparatus which projects a beam onto a photoconductive drum according to image data comprising:
a light source to emit the beam;
a micro polarized array to receive the beam emitted from the light source, comprising a plurality of polarized cells arrayed along a predetermined direction;
a polarization direction adjuster to adjust transmission directions of each of the polarized cells according to the image data; and
a light detecting plate to receive the beam from the micro polarized array, to transmit polarized elements of the received beam in a predetermined direction therethrough and to emit the transmitted elements to the photoconductive drum,
wherein the polarized cells are made of high polymer materials which vary in polarization direction in accordance with whether tension is applied, and the polarization direction adjuster includes a plurality of driving devices respectively connected to each of the polarized cells to contract the polarized cells according to electrical signals of the image signal.

6. The beam scanning apparatus in claim 5, wherein the driving devices are piezoelectric sensors.

7. An apparatus comprising:
a light source to emit a plurality of beams;
a plurality of polarized cells to receive the emitted beams and transmit the received beams, respective transmission directions of the polarized cells varying according to whether the respective cells are contracted; and
a polarization direction adjuster to adjust the transmission directions of the polarized cells according to image data.

8. The apparatus in claim 7, further comprising a light detecting plate to receive the transmitted beams from the polarized cells and to selectively transmit polarized elements of the received beams according to respective polarized directions of the polarized elements upon exiting the polarized cells.

9. The apparatus in claim 8, wherein the polarized cells are arranged in an array.

10. The apparatus in claim 9, wherein the light detecting plate, the array of polarized cells, and the polarization direction adjuster are arranged in a same plane in parallel with respect to the light source.

11. The apparatus in claim 8, wherein the light detecting plate transmits the polarized elements of the received beams in a predetermined direction.

12. The apparatus in claim 11, wherein the light detecting plate respectively transmits the polarized elements when the respective polarized directions of the polarized elements correspond to the predetermined direction.

13. The apparatus in claim 11, wherein the light detecting plate does not respectively transmit the polarized elements when the respective polarized directions of the polarized elements do not correspond to the predetermined direction.

14. The apparatus in claim 7, wherein the polarized cells are made of a Poly Vinyl Alcohol doped with iodine.

15. An apparatus comprising:
a light source to emit a plurality of beams;
a plurality of polarized cells to receive the emitted beams and transmit the received beams; and
a polarization direction adjuster to adjust transmission directions of the polarized cells according to image data,
wherein a polarization direction of the light beams received by the polarized cells is determined according to a tension applied from the polarization direction adjuster.

16. The apparatus in claim 15, wherein the polarization direction adjuster applies the tension independently to each of the polarized cells.

17. The apparatus in claim 15, wherein the polarization direction adjuster comprises piezoelectric elements to generate the tension.

18. An apparatus comprising:
a light source to emit a plurality of beams;
a plurality of polarized cells to receive the emitted beams and transmit the received beams;
a polarization direction adjuster to adjust transmission directions of the polarized cells; and
a light detecting plate to receive the transmitted beams from the polarized cells and to selectively transmit polarized elements of the received beams,
wherein the light detecting plate transmits the polarized elements of the received beams in a predetermined direction and the polarized cells are arranged in a main scanning direction of the apparatus, and the light transmitted by the polarized cells is transmitted in a sub-scanning direction of the apparatus.

* * * * *

UNITED STATES PATENT AND TRADEMARK OFFICE
CERTIFICATE OF CORRECTION

PATENT NO. : 7,199,810 B2  Page 1 of 1
APPLICATION NO. : 10/652497
DATED : April 3, 2007
INVENTOR(S) : Dae-hwan Kim It is certified that error appears in the above-identified patent and that said Letters Patent is hereby corrected as shown below:

Claim 3, Column 7, Line 9, Change "source" to --source,--

Signed and Sealed this

Tenth Day of July, 2007

JON W. DUDAS
*Director of the United States Patent and Trademark Office*